US007688791B2

(12) United States Patent
Fujita (10) Patent No.: US 7,688,791 B2
(45) Date of Patent: Mar. 30, 2010

(54) COMMUNICATIONS APPARATUS, IMAGE SENSING APPARATUS AND CONTROL METHOD THEREFOR (75) Inventor: Shunji Fujita, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1176 days.

(21) Appl. No.: 11/031,260

(22) Filed: Jan. 7, 2005

(65) Prior Publication Data
US 2005/0122934 A1    Jun. 9, 2005

Related U.S. Application Data (63) Continuation of application No. PCT/JP2004/017641, filed on Nov. 19, 2004.

(30) Foreign Application Priority Data

Dec. 9, 2003  (JP)  ............... 2003-411029

(51) Int. Cl.
H04W 4/00   (2009.01)
(52) U.S. Cl. .................. 370/338; 370/254; 709/220
(58) Field of Classification Search ............ None
See application file for complete search history.

(56) References Cited

U.S. PATENT DOCUMENTS

| 7,257,644 | B2 * | 8/2007 | Simonnet et al. ............ 709/238 |
| 2003/0060235 | A1 | 3/2003 | Yamato |
| 2004/0059963 | A1 * | 3/2004 | Simonnet et al. ............ 714/47 |
| 2004/0201866 | A1 * | 10/2004 | Maekawa et al. ........... 358/1.13 |
| 2005/0108331 | A1 * | 5/2005 | Osterman ................. 709/205 |
| 2006/0037036 | A1 * | 2/2006 | Min et al. ................. 725/1 |

FOREIGN PATENT DOCUMENTS

| JP | 2003-177980 | 4/2003 |
| JP | 2003-110568 | 6/2003 |

OTHER PUBLICATIONS

"UPnP Device Architecture", Version 1.0, Jun. 8, 2000. http://www.upnp.org/download/UpnPDA10_20000613.htm.

* cited by examiner

Primary Examiner—Bob A Phunkulh
(74) Attorney, Agent, or Firm—Fitzpatrick, Cella, Harper & Scinto (57) ABSTRACT A communications apparatus includes a network connection unit and a control unit. The control unit controls the communications apparatus to transmit a first message and then transmit a second message, if the communications apparatus is participating in a network via the network connection unit. The first message is used to notify an external device that the communications apparatus is separated from the network, and the second message is used to notify the external device that the communications apparatus is participating in the network.

10 Claims, 10 Drawing Sheets

```
NOTIFY* HTTP/1.1
HOST: 239.255.255.250:1900
NT: urn:schemas-upnp-org:device:MediaServer:1
NTS: ssdp:byebye
USN: uuid:db49a324-a100-4b21-b00d-0ed9e4f0bbbb::urn:schemas-upnp-org:device:MediaSerer:1
```

FIG. 4

```
NOTIFY* HTTP/1.1
HOST: 239.255.255.250:1900
CACHE-CONTROL: max-age=1800
LOCATION: http://169.254.10.10/DeviceDescription.xml
NT: urn:schemas-upnp-org:device:MediaServer:1
NTS: ssdp:byebye
SERVER: UPnPDeviceOS/1.0, UPnP/1.0, UPnPDVCR/1.0
USN: uuid:db49a324-a100-4b21-b00d-0ed9e4f0bbbb::urn:schemas-upnp-org:device:MediaSerer:1
```

FIG. 5

```
SUBSCRIBE /upnp/event/cds HTTP/1.1
HOST: 169.254.10.10
CALLBACK: http://169.254.10.20:5000/notify
TIMEOUT: Second-1800
```

| IP ADDRESS | uuid | DEVICE SPECIFIC DATA | STATUS |
|---|---|---|---|
| 239.255.255.100 | × × × × × × × | ............ | ............ |
| 239.255.255.101 | db49a324-a100 ·· | ............ | ............ |
| ⋮ | | | |
| | | | |

COMMUNICATIONS APPARATUS, IMAGE SENSING APPARATUS AND CONTROL METHOD THEREFOR

TECHNICAL FIELD

The present invention concerns a communications technology for a communications apparatus having a network interface.

BACKGROUND ART

In recent years, network technologies for searching for a device that provides predetermined services on a network have been developed. One such technology is UPnP, or Universal Plug and Play (for example, UPnP Device Architecture Version 1.0, 8 Jun. 2000).

In UPnP, "service", "device" and "control point" are predefined. A "service" is a logical unit that provides a predetermined service, a "device" is a logical unit that has one or more services, and a control point is a logical unit that controls one or more services. Hereinafter, a device prescribed by UPnP is called a "UPnP device", a control point prescribed by UPnP is called a "UPnP control point" and a network prescribed by UPnP is called a "UPnP network".

With UPnP, transmission of a SSDP:ALIVE message (that is, a message indicating that a UPnP device is present on the UPnP network), a SSDP:BYEBYE message (a message indicating that a UPnP device is separating or escaping from the network) and the like is carried out using SSDP (Simple Service Discovery Protocol).

Moreover, in UPnP, it is prescribed that information unique to a UPnP device (hereinafter device specific information) and information unique to a service (hereinafter service-specific information) be written in XML (Extensible Markup Language). It should be noted that a UUID (Universally Unique Identifier) that is an identifier unique to the UPnP device, the device specific information, and the service-specific information can be obtained using the SSDP:ALIVE message. The UPnP control point continues to hold such information until a period of time that the SSDP:ALIVE message specifies elapses (1800 seconds or 30 minutes or more) or until receipt of the SSDP:BYEBYE message.

Figure 9:
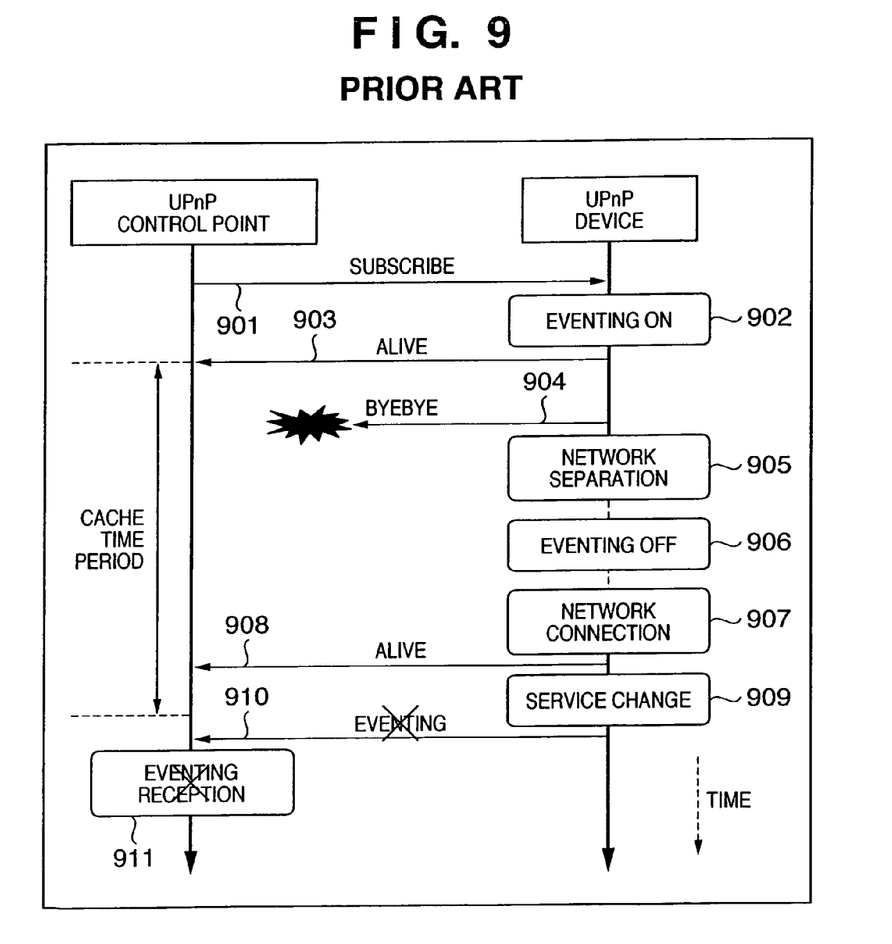
FIG. 9 is a diagram illustrating a defect in the current UPnP discovery protocol.

FIG. 9 is a diagram illustrating a defect in the current UPnP discovery protocol.

In step 901, the UPnP control point transmits a SUBSCRIPTION message to a UPnP device having a service A.

In step 902, the UPnP device, having received the SUBSCRIPTION message, renders the eventing of service A valid (ON). When the service A eventing is valid, each time the UPnP device detects a change of status of service A the UPnP device notifies the UPnP control point of that change in service status.

In step 903, the UPnP device, before the previously set cache time period elapses, transmits in multicast an SSDP: ALIVE message setting the next cache period. By transmitting the SSDP:ALIVE message, the UPnP device can announce that it is participating in the UPnP network.

In step 904, the UPnP device transmits a SSDP:BYEBYE message in multicast before separating from the UPnP network. However, FIG. 9 presumes a state in which the SSDP: BYEBYE message is not transmitted from the UPnP device, or the SSDP:BYEBYE message does not reach the UPnP control point. Such a state arises when, for example, (1) the battery for the UPnP device is removed by the user before the SSDP:BYEBYE message is transmitted, (2) the UPnP device is moved beyond communication range before the SSDP: BYEBYE message is transmitted, or (3) communication conditions are poor. In these cases, the UPnP control point continues to hold the device specific information of the UPnP device because the UPnP device cannot detect the separation of the UPnP network from the UPnP network.

In step 905, the UPnP device separates from the UPnP network.

In step 906, the UPnP device renders eventing invalid (OFF).

In step 907, the UPnP device again participates in the UPnP network before the cache time period established in step 903 elapses.

In step 908, the UPnP device transmits in multicast an SSDP:ALIVE message designating cache time period. At this time, the UPnP control point, because it receives the SSDP: ALIVE message without receiving the SSDP:BYEBYE message, cannot know that the UPnP device has once separated from the UPnP network. That is, the UPnP control point thinks that the UPnP device continues to participate in the UPnP network without having once separated therefrom.

In step 909, the UPnP device changes the status of service A according to the instructions from the user.

In step 910, the UPnP device, having once again reconnected to the UPnP network, cannot transmit an EVENT message to the UPnP control point even if there is a change in the status of the service A because the service A eventing is not rendered valid (ON).

In step 911, the UPnP control point, without being able to receive an EVENT message from the UPnP device, cannot perceive the UPnP device status change. As a result, the status of the service A managed by the UPnP control point and the actual status of service A no longer match, and the UPnP control point becomes unable to control service A properly. This sort of problem arises because the SSDP:BYEBYE message that the UPnP device transmits when separating from the UPnP network did not reach the UPnP control point.

DISCLOSURE OF INVENTION

The present invention is conceived as a solution to the foregoing problem, and has as an object to provide a network technology that can carry out smoothly re-connection to a network even if, for whatever reason, a message indicating separation from the network (for example, an SSDP:BYEBYE message) does not reach a control apparatus on the network (for example, a UPnP control point).

In an aspect of the present invention, a communications apparatus includes network connection means, and control means for controlling the communications apparatus to transmit a present message indicating presence on a network after connection to the network by the network connection means, wherein the control means is adapted to control to transmit an absent message indicating separation from the network before transmitting the initial present message when connection to the network is established using the network connection means.

Other features, objects and advantages of the present invention will be apparent from the following description when taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

Preferred embodiments of the present invention will now be described in detail according to the accompanying drawings.

Figure 1:
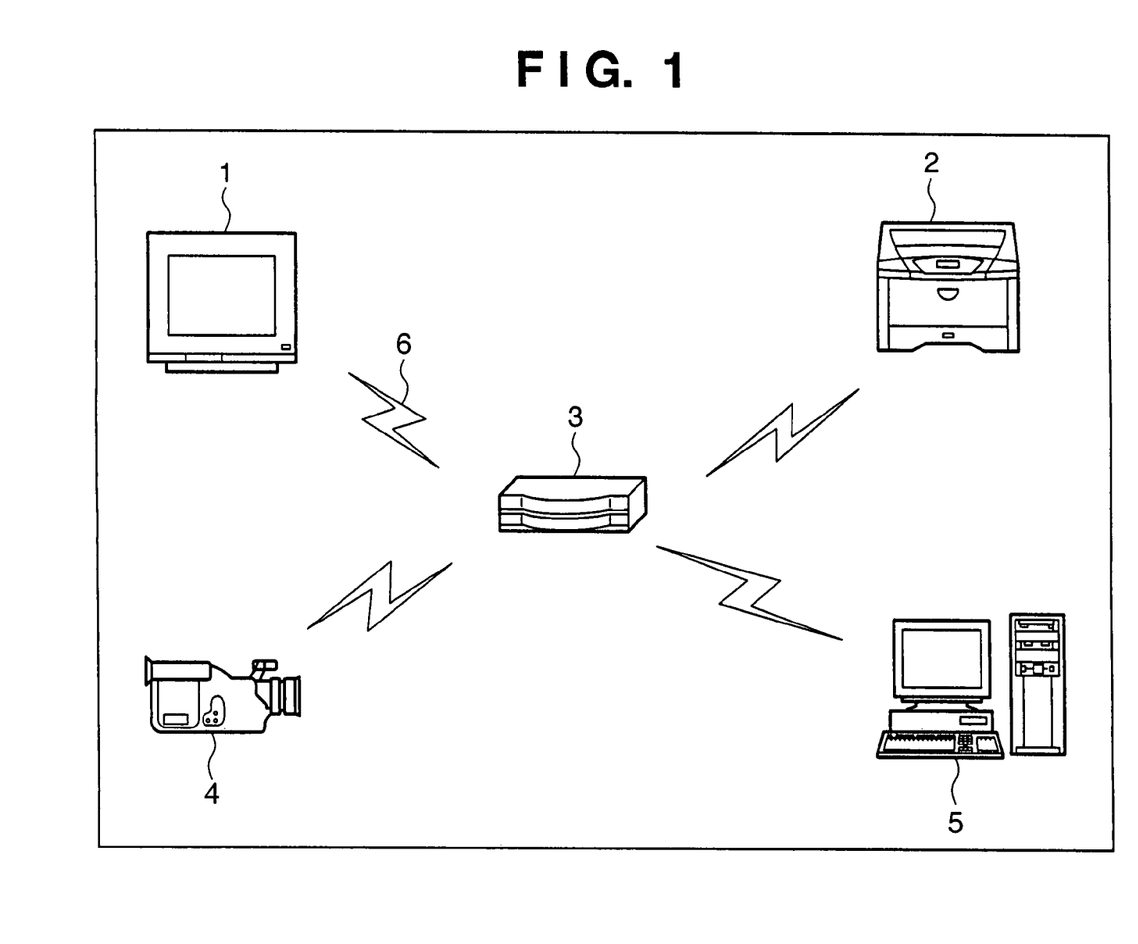
FIG. 1 is a diagram showing the configuration of a UPnP network according to an embodiment of the present invention.

FIG. 1 is a diagram showing the configuration of a UPnP network according to an embodiment of the present invention.

In FIG. 1, a DVCR (digital video cassette recorder) 4, a DTV (digital television broadcast receiver) 1, a printer 2 and an access point 3 are communications devices that operate as UPnP devices and can communicate by wireless communications. The DVCR 4 is capable of taking moving images or still images, and is an example of an image sensing apparatus (digital camera or the like) which has the ability to store or to record sensed image data on a removable storage medium (such as magnetic tape, a memory card or the like). Moreover, the DVCR 4 is an example of an image processing apparatus with the ability to read and reproduce the image data (moving images or still images) stored or recorded on the removable storage medium and to display the read or reproduced image data on a liquid crystal display or the like. Further, the DVCR 4 is an example of a portable device driven by a removable battery. The PC (personal computer) 5 is a control device that operates as a UPnP control point. The DVCR 4, DTV 1, printer 2, access point 3 and PC 5 can communicate with each other over a network interface compliant with IEEE 802.11x (where x is a, b, g), UltraWideBand or Bluetooth. It should be noted that the transmission medium that comprises the UPnP network is not limited to a wireless transmission medium, and part or all of the transmission medium of the UPnP network may be replaced with a wire transmission medium. In this case, the DVCR 4, DTV 1, printer 2, access point 3 and PC 5 can communicate with each other over a network interface compliant with Ethernet, USB (Universal Serial Bus) and IEEE 1394 standard (IEEE 1394-1995 or the like).

Moreover, in FIG. 1, the DVCR 4 is MediaSaver established by the AV Working Committee (WC), and is comprised of a ConnectionManager service, a ContentDirectory service and an AVTransport service. Moreover, the DTV 1 is MediaRenderer established by the AV WC, the printer 2 is a Basic Device established by the Basic WC, and the access point 3 is an InternetGateway Device established by the Internet Gateway WC. The PC 5 may be a laptop PC or a PDA.

In the present embodiment, for the sake of simplicity a detailed description is provided only of the processes executed between the DVCR 4 and the PC 5. However, these processes can be executed in the same way between UPnP devices other than the DVCR 4 and the control point as well. In other words, the processes executed between the DVCR 4 and the PC 5 can also be executed between the DTV 1 (or the printer 2) and the PC 5 in the same way.

Figure 7:
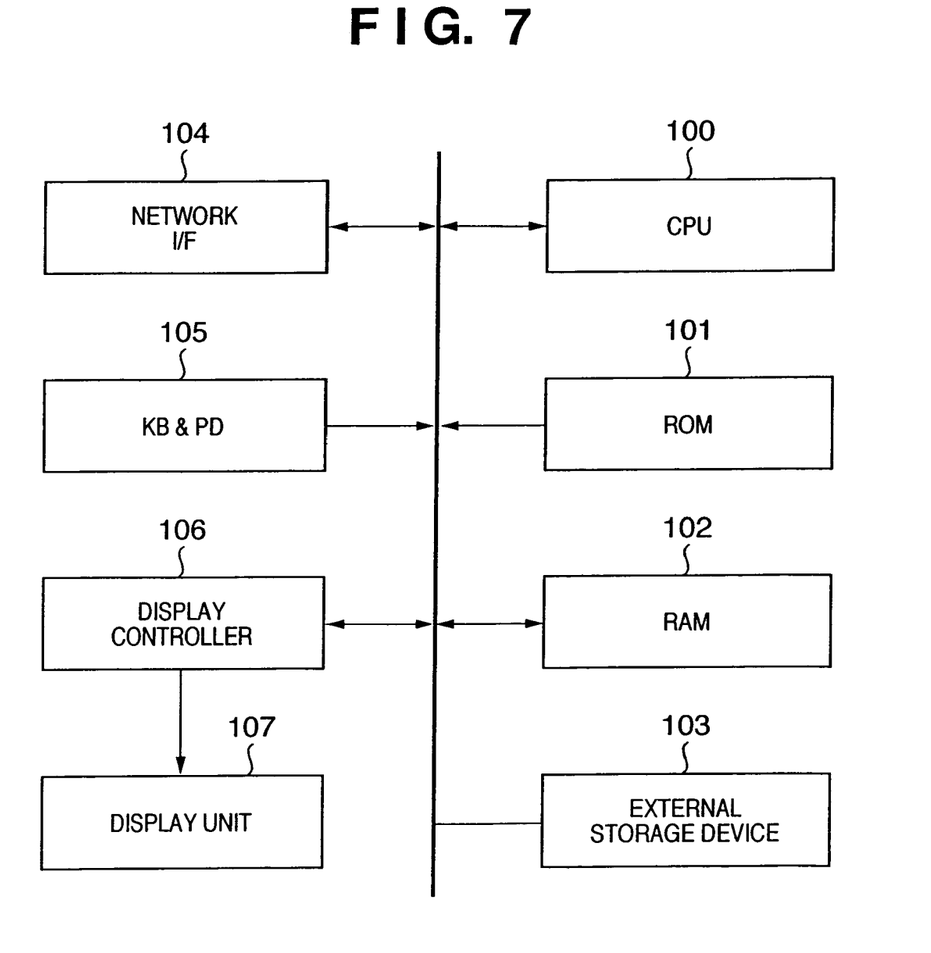
FIG. 7 is a block diagram illustrating major constituent elements of a PC that is the UPnP control point.
Figure 8:
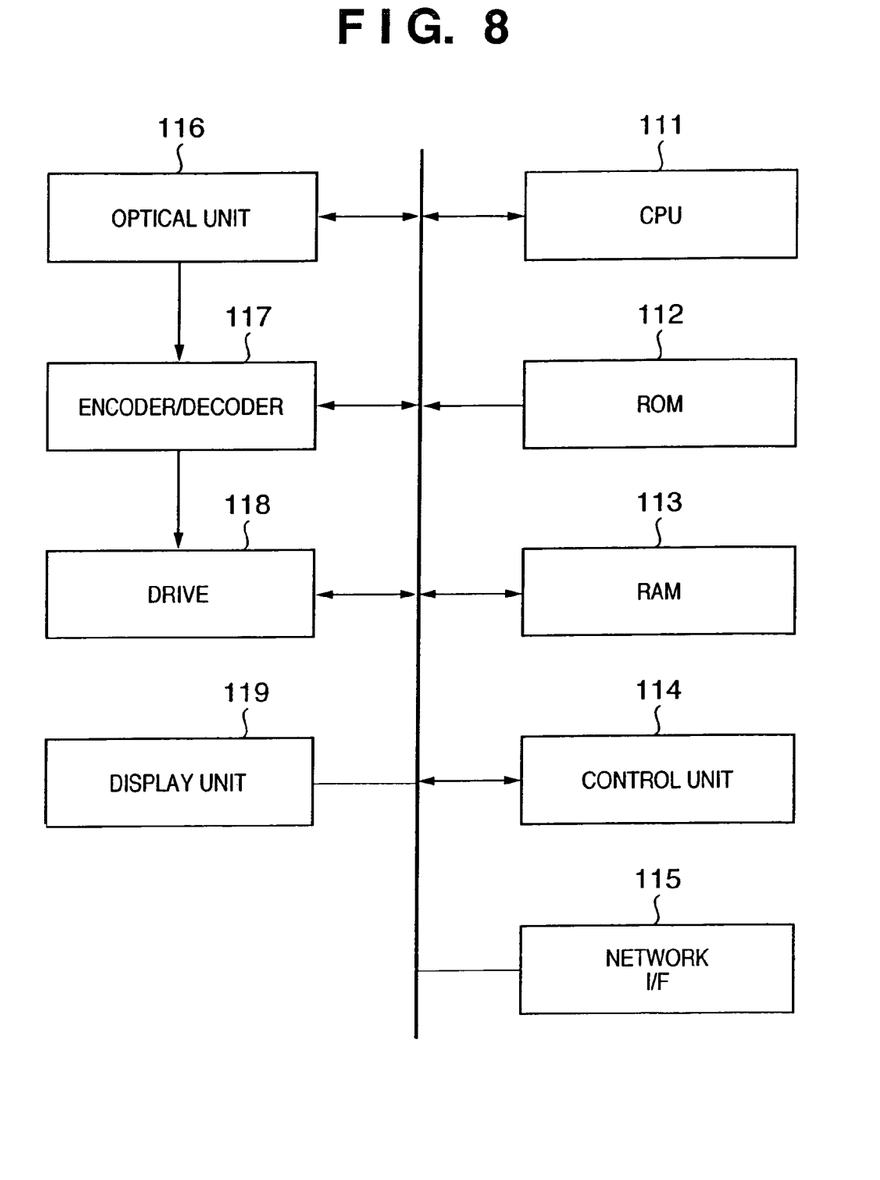
FIG. 8 is a block diagram illustrating major constituent elements of a DVCR that is the UPnP device.

FIG. 7 is a block diagram illustrating major constituent elements of a PC that is the UPnP control point. FIG. 8 is a block diagram illustrating major constituent elements of a DVCR that is the UPnP device.

The PC 5 is comprised first of a CPU 100 that controls the PC 5, a ROM 101 storing a boot program and a BIOS (Basic Input Output System), and a RAM 102 used as a work area. Reference numeral 103 denotes an external storage device (a hard disk drive or the like) storing the OS and a variety of applications, a program that functions as a UPnP control point and interprets and executes XML, and data files and the like. Reference numeral 104 denotes a network interface (in the present embodiment, an IEEE 802.11a interface), numeral 105 denotes an input device consisting of a keyboard (KB) and a pointing device (PD) such as a mouse (registered trademark), 106 denotes a display controller with a built-in video memory that renders image data to the video memory as well as reads the image data from the video memory and outputs it as video signals in accordance with instructions from the CPU 100, and 107 denotes a display unit that displays as images data rendered to the video memory based on video signals from the display controller 106.

In such a configuration, after power is supplied to the devices and the OS loaded into the RAM 102 from the external storage device 103 and the OS is started, an application program that becomes the UPnP control point is read from the external storage device 103 and the PC 5 functions as a UPnP control point described by the present embodiment.

Figure 10:
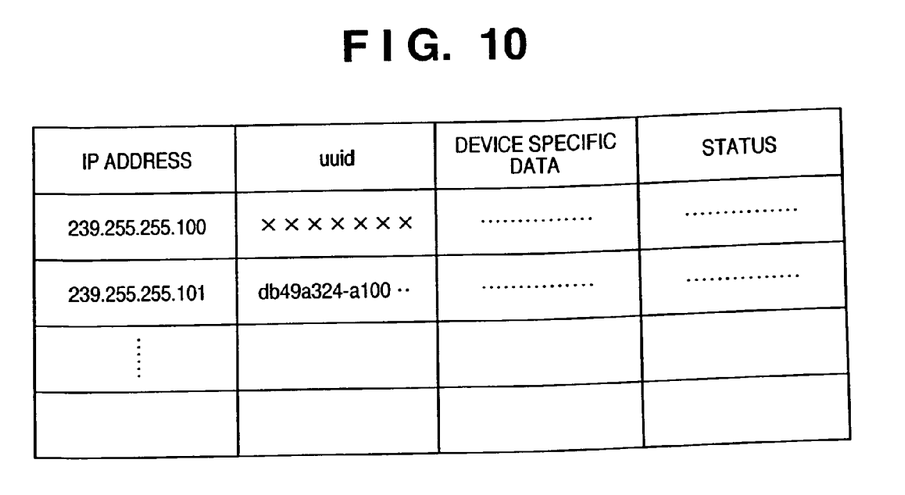
FIG. 10 is a diagram illustrating a device control table stored in the PC.

The PC 5 stores a device management table in the RAM 102 or the external storage device 103. A device management table is a table for managing device specific information of a UPnP device having a service that the PC 5 controls (UUID, device description containing information unique to that device, service description containing information unique to that service, etc.). FIG. 10 is a diagram showing an example of a device management table. As shown in FIG. 5, the device management table is composed of areas for registering such information as an IP address, UUID (Universally Unique Identifier), device specific information, and information indicating the status of the UPnP device.

By contrast, the DVCR 4, as shown in FIG. 8, is composed first of a CPU 111 that controls the DVCR 4. Reference numeral 112 denotes a ROM storing a control program, the DVCR 4 UUID, device description, service description and the like, 113 denotes a RAM used as a work area, and 114 denotes a control unit having a recording button and various switches and buttons, as well as a button that switches UPnP network participation ON/OFF (a network participation button). Reference numeral 115 denotes a network interface for connecting to the UPnP network, 116 denotes an optical unit composed of an optical lens, a CCD and the like, 117 denotes an encoder/decoder that performs a compression encoding/decoding process on data, 118 denotes a drive that writes data to and reads data from a storage medium (a disk, magnetic tape or the like), and 119 denotes a display unit.

It should be noted that, at network participation, clearly, the network participation button is pressed and an ON status engendered. By contrast, separation from the network is accomplished either when that button is again pressed or when the power OFF button is operated.

The DVCR 4 functions as a UPnP device when the power is turned ON and the above-described button for subscribing to the UPnP network is pressed. As described above, the DVCR 4 functions as MediaServer on the UPnP network, and is a device that has ConnectionManager service, ContentDirectory service and AVTransport service. Of these services, the AVTransport service denotes the service that transmits sensed images upon request from the PC 5, with the transmission destination being the PC 5 or the DTV 1.

Figure 2:
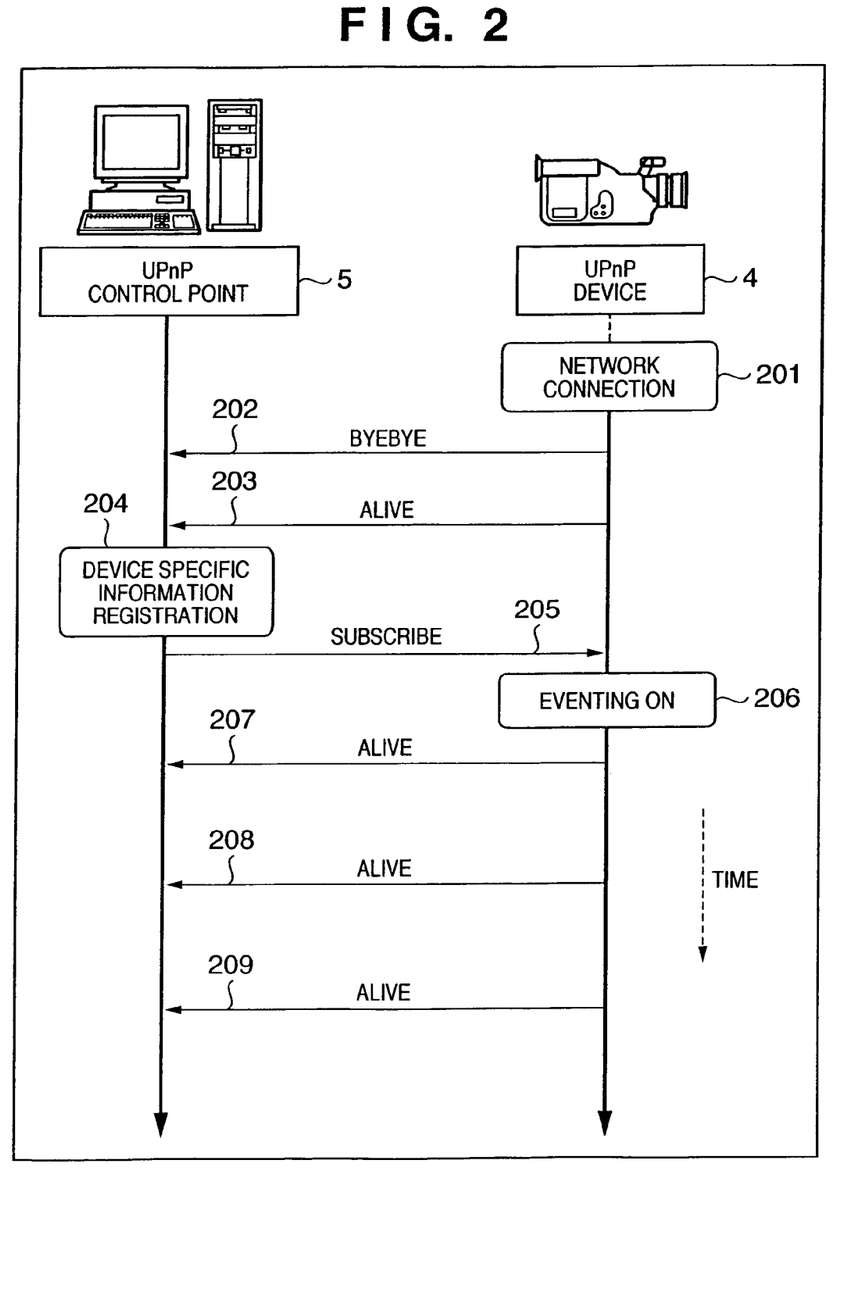
FIG. 2 is a diagram illustrating a processing procedure executed when a DVCR participates in a UPnP network according to the present embodiment.

FIG. 2 is a diagram illustrating a processing procedure executed when the DVCR 4 participates in the network in the present embodiment. It should be noted that, in FIG. 2, the processes executed by the DVCR 4 and the PC 5 are processes that are controlled by software.

In step 201, when the UPnP network participation button is turned ON in a state in which the power is turned ON, the DVCR 4 participates in the UPnP network through the network interface 115 (alternatively, participation may also be triggered by turning the power ON, but the foregoing arrangement is adopted here because UPnP network participation might not be carried out due to outside influences). It should be noted that, in the present embodiment, the access point 3 is a DHCP server, with the IP address necessary for participation in the UPnP network being obtained from the access point 3.

In step 202, the DVCR 4, in order to delete the device specific information of the DVCR 4 from the device management table managed by the PC 5, transmits in multicast an SSDP:BYEBYE message before transmitting an SSDP: ALIVE message. This process is a process not established under the current UPnP protocol. The PC 5, having received the SSDP:BYEBYE message, deletes the device specific information corresponding to the UUID contained in the SSDP:BYEBYE message from the device management table shown in FIG. 10. By thus notifying the PC 5 of separation from the UPnP network before notifying the PC 5 of participation in the UPnP network, the DVCR 4 can get the PC 5 to delete the DVCR 4 device specific information. As a result, the DVCR 4 is able to let the PC 5 know that the DVCR 4 has separated from the UPnP network before the cache time period (minimum time period 1800 seconds) elapses. In other words, the defect in the current UPnP discovery protocol can be eliminated.

Figure 3:
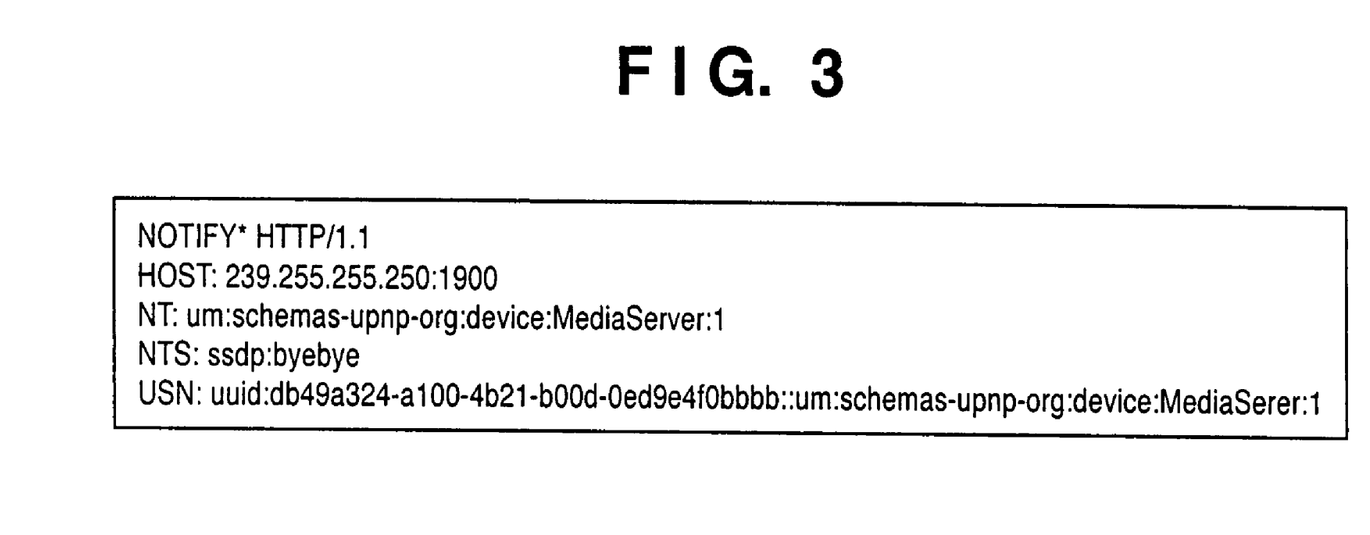
FIG. 3 is a diagram showing an example of a SSDP: BYE-BYE message in the present embodiment.

An example of the SSDP:BYEBYE message transmitted in step 202 is shown in FIG. 3. In FIG. 3, the description "b49 . . . bbbb" in the fifth line represents a UUID that is a unique identifier of the DVCR 4. By this UUID, the PC 5 can know that this SSDP:BYEBYE message is a message from the DVCR 4 and can delete the DVCR 4 device specific information from the device management table.

In step 203, the DVCR 4, after transmitting a SSDP:BYEBYE message, transmits a SSDP:ALIVE message in multicast. By transmitting the SSDP:ALIVE message, the PC 5 can be made aware of the fact that the DVCR 4 has participated in the network.

Figure 4:
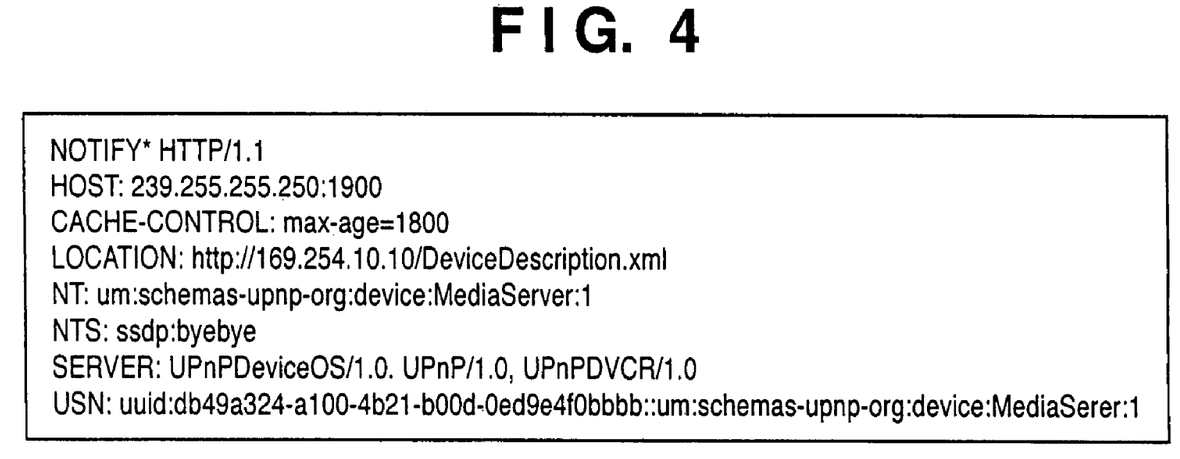
FIG. 4 is a diagram showing an example of a SSDP:ALIVE message in the present embodiment.

An example of the SSDP:ALIVE message transmitted in step 203 is shown in FIG. 4. In FIG. 4, the "CACHE-CONTROL:max-age=1800" described in the third line indicates that the cache time period, which is the period of time in which to register device specific information of the DVCR 4, is 1800 seconds (30 minutes). The description "LOCATION: http://169.254.10.10/DeviceDescription.xml" in the fourth line indicates the location of the Device Description comprising a variety of information concerning the DVCR 4. The Device Description is one type of DVCR 4 device specific information, having information unique to the UPnP device as well as the friendly Name, the PresentationURL and the like established by UPnP protocol. The description "db49 . . . bbbb" in the last line indicates the DVCR 4 UUID (Universally Unique Identifier).

In step 204, the PC 5 determines the time period for registering the device specific information of the DVCR 4 based on the values described in the SSDP:ALIVE message CACHE-CONTROL. Moreover, the PC 5 acquires the Device Description having the variety of information related to the DVCR 4 using the URL described by the SSDP: ALIVE message LOCATION. Further, the PC 5 obtains a Service Description having a variety of information related to the ConnectionManager service, the ContentDirectory service and the AVTransport service using the Device Description so obtained. The PC 5 then registers device specific information containing the Device Description and the Service Description in the RAM 102.

An example of the SSDP:ALIVE message transmitted in step 204 is shown in FIG. 4. In FIG. 4, the "CACHE-CONTROL:max-age=1800" described in the third line indicates that the cache time period, which is the time period for registering the device specific information for the DVCR 4, is 1800 seconds (30 minutes). In addition, the "LOCATION: http://169.254.10.10/DeviceDescription.xml" that is described in the fourth line indicates the location of the DeviceDescription having a variety of information concerning the DVCR 4. The Device Description is one type of DVCR 4 device specific information, having information unique to the UPnP device as well as the friendlyName, the PresentationURL and the like established by UPnP protocol. The description "db49 . . . bbbb" in the last line indicates the UUID (Universally Unique Identifier) of the DVCR 4.

In step 205, the PC 5, in order to control the services of the DVCR 4, carries out a SUBSCRIBE for the DVCR 4 services. In the present embodiment, SUBSCRIBE is carried out for the ConnectionManager service, the ContentDirectory service and the AVTransport service.

Figure 5:
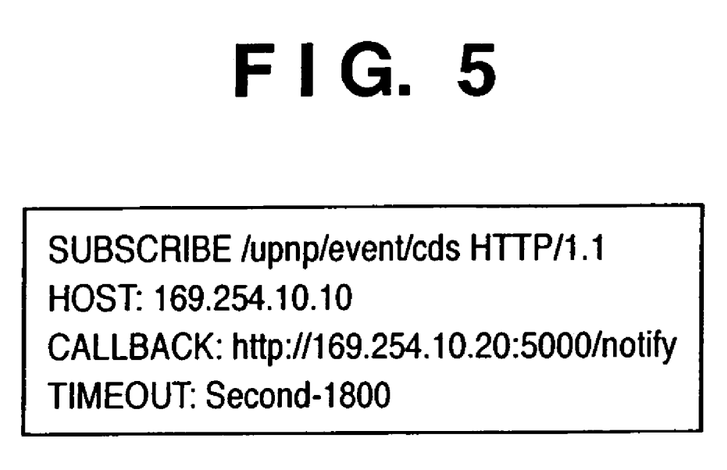
FIG. 5 is a diagram showing an example of a SUBSCRIPTION message in the present embodiment.

An example of the SUBSCRIPTION message sent in step 205 is shown in FIG. 5. The "HOST: 169.254.10.10" described in the second line indicates the IP address of the PC 5 that is the UPnP control point.

In step 206, the DVCR 4, after receiving the SUBSCRIPTION message, renders eventing for the services corresponding to that SUBSCRIPTION message valid (ON). It should be noted that eventing is a function that notifies the UPnP control point of any service status change. With such notice, the PC 5 can then control the services of the DVCR 4 and can also ascertain any change in the status of the services.

In steps 207, 208 and 209, the DVCR 4 again transmits a SSDP:ALIVE message in multicast before the cache time (1800 seconds in the present embodiment) elapses. This process continues until the DVCR 4 separates from the UPnP control point.

Figure 6:
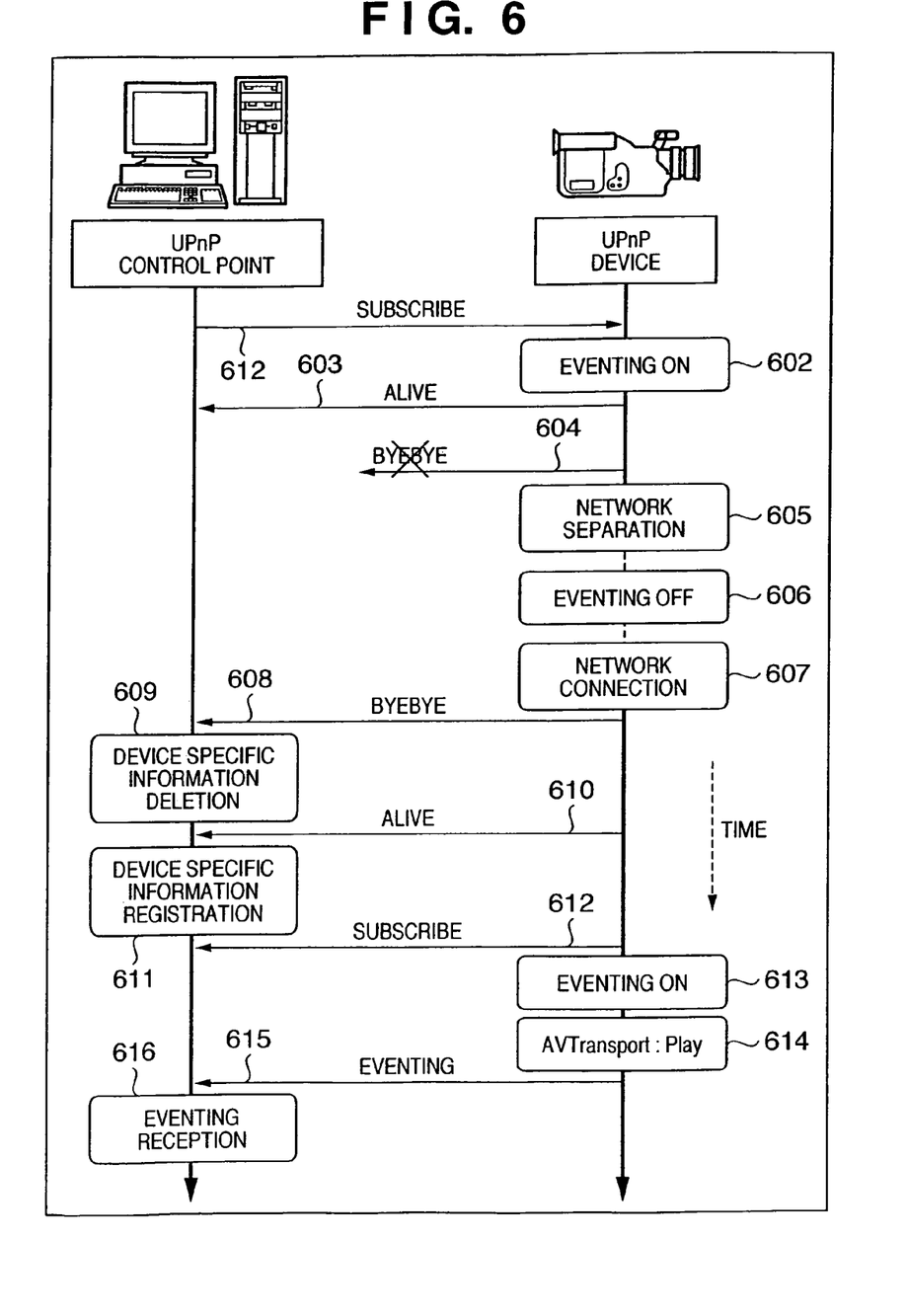
FIG. 6 is a diagram illustrating a processing procedure executed when a DVCR separates from the UPnP network and then again participates in the UPnP network before a cache time period elapses in the present embodiment.

FIG. 6 is a diagram illustrating a processing procedure executed when the DVCR 4 separates from the UPnP network and then again participates in the UPnP network before the cache time period elapses in the present embodiment. It should be noted that, in FIG. 6, the processes executed by the DVCR 4 and the PC 5 are controlled by software.

In step 601, the PC 5, in order to control the services of the DVCR 4, carries out a SUBSCRIBE for services of the DVCR 4. In the present embodiment, SUBSCRIBE is carried out for the ConnectionManager service, the ContentDirectory service and the AVTransport service.

In step 602, the DVCR 4, after receiving the SUBSCRIPTION message, renders the eventing of the services corresponding to that SUBSCRIPTION message valid (ON).

In step 603, the DVCR 4 transmits in multicast a SSDP:ALIVE message that sets the next cache time period before the previously set cache time period elapses.

In step 604, the DVCR 4 transmits in multicast a SSDP:BYEBYE message before separating from the UPnP network. However, in the present embodiment, it is assumed that the SSDP:BYEBYE message is not transmitted from the DVCR 4, or the SSDP:BYEBYE does not reach the PC 5. Such a state arises when, for example, (1) the battery for the UPnP device is removed by the user before the SSDP:BYEBYE message is transmitted, (2) the UPnP device is moved beyond communication range before the SSDP:BYEBYE message is transmitted, or (3) communication conditions are poor. In anyone of these cases, the PC 5 cannot detect the separation of the DVCR 4 from the UPnP network.

In step 605, the DVCR 4 separates from the UPnP network.

In step 606, the DVCR 4 renders the eventing of the services invalid (OFF).

In step 607, the DVCR 4 again participates in the UPnP network before the cache time period set in step 603 elapses.

In step 608, the DVCR 4, in order to delete the device specific information of the DVCR 4 from the device management table managed by the PC 5, transmits a SSDP:BYEBYE message in multicast before transmitting an SSDP:ALIVE message. This process is not prescribed under current UPnP protocol.

In step 609, the PC 5, having received the SSDP:BYEBYE message, deletes the device specific information corresponding to the UUID contained in the SSDP:BYEBYE message from the device management table shown in FIG. 10. By notifying the PC 5 that the DVCR 4 separates from the UPnP network before notifying the PC 5 that the DVCR 4 participates in the UPnP network, the DVCR 4 can have the PC 5 delete the device specific information for the DVCR 4. As a result, the DVCR 4 can get the PC 5 to recognize that the DVCR 4 has separated from the UPnP network before the cache time period (minimum time period 1800 seconds) elapses. In other words, the defect in the current UPnP discovery protocol can be eliminated.

In step 610, the DVCR 4 transmits a SSDP:ALIVE message in multicast after transmitting the SSDP:BYEBYE message. By transmitting the SSDP:ALIVE message, the DVCR 4 can get the PC 5 to recognize that the DVCR 4 is participating in the UPnP network.

In step 611, the PC 5 determines the time period in which to register the DVCR 4 device specific information based on the values described by the SSDP:ALIVE message CACHE-CONTROL. Moreover, the PC 5 obtains a Device Description having a variety of information relating to the DVCR 4 using the URL described by the SSDP:ALIVE message LOCATION. Furthermore, using the Device Description thus obtained the PC 5 obtains a Service Description having a variety of information relating to the ConnectionManager service, the ContentDirectory service and the AVTransport service. The PC 5 then registers the device specific information including the Device Description and the Service Description thus obtained in the RAM 102.

In step 612, the PC 5, in order to control the services of the DVCR 4, carries out a SUBSCRIBE for services of the DVCR 4. In the present embodiment, SUBSCRIBE is carried out for the ConnectionManager service, the ContentDirectory service and the AVTransport service.

In step 613, the DVCR 4, after receiving the SUBSCRIPTION message, renders the eventing of the services corresponding to that SUBSCRIPTION message valid (ON). With such notice, the PC 5 can then control the services of the DVCR 4 and can also ascertain any change in the status of the services.

In step 614, the DVCR 4 changes the status of the AVTransport service in accordance with instructions from the user. In the present embodiment, a description is given of an instance in which the status of the AVTransport service is changed from STOPPED to PLAYING. It should be noted that the destination of the video transmission when reproducing the visual images sensed by the DVCR 4 depends on the request from the PC 5. For example, in a case in which the DTV 1 is designated as a transmission destination, then the transmission destination is transmitted to the DTV 1 (in actuality the DTV 1 IP address), and in a case in which the PC is designated as the transmission destination, then the video transmission address and the status transmission address are the same.

In step 615, because the AVTransport service eventing has been rendered valid (ON), the DVCR 4 transmits an EVENT message indicating that the AVTransport service status has changed to the PC 5, thus enabling the PC 5 to continue to be able to control the DVCR 4 after the DVCR 4 resubscribes.

In step 616, the PC 5, having received the EVENT message, checks the current status of the AVTransport service and informs the user of the current status of the AVTransport service.

Thus, as described above, according to the present embodiment, the DVCR 4 can transmit a SSDP:BYEBYE message before transmitting a SSDP:ALIVE message, and therefore the DVCR 4 can re-subscribe smoothly to the UPnP network, even if for some reason the SSDP: BYEBYE message transmitted when the DVCR 4 separates from the UPnP network (that is, a message indicating that the DVCR 4 separates from the UPnP network) does not reach the PC 5. Moreover, according to the present embodiment, if the DVCR 4 is reconnected within the cache time period, the need for the PC 5 to delete the device specific information of DVCR 4 from the device management table is eliminated, enabling instantaneous control of the services of the DVCR 4.

It should be noted that, although the present embodiment describes a configuration in which the PC 5 functions as the UPnP control point and the DVCR 4 functions as the UPnP device, the present invention is not limited to such an arrangement. For example, the PC 5 can also function as a communications device having a UPnP device. Or, the DVCR 4 can function as a communications device having a UPnP control point.

As can be understood by those of ordinary skill in the art, a computer program executing the steps of the method and implementing the functions of the system described above is within the scope of the present invention. Moreover, because such a computer program can be executed by setting a computer-readable storage medium storing such a computer program (such as a memory card, a CD-ROM or the like) into a computer or by copying or installing same to a system of which the computer is a part, the computer-readable storage medium also is within the scope of the present invention.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-411029 filed on Dec. 9, 2003, which is hereby incorporated by reference herein.

The invention claimed is:

1. A communications apparatus comprising:
   a network connection unit configured to connect to a network to participate in the network upon the occurrence of a predetermined event; and
   a control unit configured to control the communications apparatus to transmit a first message onto the network before a second message is transmitted from the communications apparatus onto the network, when the network connection unit connects to the network to participate in the network upon the occurrence of the predetermined event, wherein the control unit controls the communications apparatus to transmit the second message onto the network after the first message is transmitted from the communications apparatus onto the network,
   wherein the first message is used to notify an external device on the network that the communications apparatus is separated from the network so that the external device deletes device specific information of the communications apparatus from a device management table managed by the external apparatus, and the second message is used to notify the external device on the network that the communications apparatus is participating in the network so that the external device registers device specific information of the communications apparatus in the management table after the device specific information has been deleted based on the first message.

2. The communications apparatus according to claim 1, wherein the network is a UPnP network.

3. The communications apparatus according to claim 1, wherein the network connection unit includes a wireless network interface.

4. The communications apparatus according to claim 1, wherein the first message is a SSDP:BYEBYE message and the second message is a SSDP:ALIVE message.

5. The communications apparatus according to claim 1, wherein the predetermined event is one of a power-on of the communications apparatus and an activation of a network participation button of the communications apparatus.

6. A method for controlling a communications apparatus including a network connection unit, the method comprising:
   controlling the communications apparatus to connect to a network to participate on the network via the network connection unit upon the occurrence of a predetermined event;
   controlling the communications apparatus to transmit a first message onto the network before a second message is transmitted from the communications apparatus onto the network, when the network connection unit connects to the network to participate on the network upon the occurrence of the predetermined event; and
   controlling the communications apparatus to transmit the second message onto the network after the first message is transmitted from the communications apparatus onto the network,
   wherein the first message is used to notify an external device on the network that the communications apparatus is separated from the network so that the external device deletes device specific information of the communications apparatus from a device management table managed by the external apparatus, and the second message is used to notify the external device on the network that the communications apparatus is participating in the network so that the external device registers device specific information of the communications apparatus in the management table after the device specific information has been deleted based on the first message.

7. The method according to claim 6, wherein the network is a UPnP network.

8. The method according to claim 6, wherein the network connection unit includes a wireless network interface.

9. The method according to claim 6, wherein the first message is a SSDP:BYEBYE message and the second message is a SSDP:ALIVE message.

10. The method according to claim 6, wherein the predetermined event is one of a power-on of the communications apparatus and an activation of a network participation button of the communications apparatus.

* * * * *